(12) United States Patent
Ravinathan (10) Patent No.: US 11,636,482 B2
(45) Date of Patent: Apr. 25, 2023

(54) METHOD AND SYSTEM FOR VALIDATION OF IDENTITY OF A USER DURING A DIGITAL PAYMENT PROCESS

(71) Applicant: MASTERCARD ASIA/PACIFIC PTE. LTD., Singapore (SG)

(72) Inventor: Srinath Ravinathan, Singapore (SG)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 60 days.

(21) Appl. No.: 17/322,428

(22) Filed: May 17, 2021

(65) Prior Publication Data
US 2021/0406904 A1    Dec. 30, 2021

(30) Foreign Application Priority Data
Jun. 30, 2020  (SG) .......................... 10202006299Q (51) Int. Cl.
   G06Q 20/40    (2012.01)
   G06Q 20/38    (2012.01)
   H04L 9/32     (2006.01)
   G06V 40/50    (2022.01)
   G06V 40/16    (2022.01)

(52) U.S. Cl.
   CPC ..... *G06Q 20/40145* (2013.01); *G06Q 20/382* (2013.01); *G06V 40/172* (2022.01); *G06V 40/50* (2022.01); *H04L 9/3213* (2013.01); *H04L 9/3231* (2013.01); *G06Q 2220/00* (2013.01); *H04L 2209/56* (2013.01)

(58) Field of Classification Search
   None
   See application file for complete search history.

(56) References Cited

U.S. PATENT DOCUMENTS

| | | | |
|---|---|---|---|
| 10,685,379 B2* | 6/2020 | Purves | G06Q 20/3224 |
| 10,698,995 B2* | 6/2020 | Tussy | G06Q 20/3276 |
| 10,853,809 B2* | 12/2020 | Chung | H04L 9/3239 |
| 11,417,179 B1* | 8/2022 | Zalewski | G06Q 20/327 |
| 2018/0150844 A1* | 5/2018 | Dolan | G06V 40/70 |
| 2018/0308100 A1* | 10/2018 | Haukioja | G06N 20/00 |
| 2018/0373928 A1* | 12/2018 | Glaser | G06Q 20/206 |
| 2019/0300357 A1* | 10/2019 | Crawford | G06Q 20/40145 |
| 2021/0027290 A1* | 1/2021 | Tiwan | G06V 40/166 |

* cited by examiner

*Primary Examiner* — Christopher Bridges
(74) *Attorney, Agent, or Firm* — Pillsbury Winthrop Shaw Pittman LLP (57) ABSTRACT

A method for validation of identity of a user during a digital payment process comprises: receiving a user identifier; determining, based on the user identifier, that the user is enrolled for biometric authentication; transmitting, to a mobile device associated with the user identifier, a push notification, said push notification causing an authenticator application executing on the mobile device to initiate a biometric authentication process; receiving a result of said biometric authentication process; and transmitting authentication data, based on said result, to a transaction initiation system to trigger completion of the digital payment process.

20 Claims, 7 Drawing Sheets

METHOD AND SYSTEM FOR VALIDATION OF IDENTITY OF A USER DURING A DIGITAL PAYMENT PROCESS

RELATED APPLICATIONS

This application claims priority to Singaporean Application Serial No. 10202006299Q, filed Jun. 30, 2020, which is incorporated herein by reference in its entirety.

TECHNICAL FIELD

The present disclosure relates to methods and systems for validation of identity of a user during a digital payment process, such as a secure remote commerce (SRC) payment process.

BACKGROUND

Payment card-based electronic commerce (e-commerce) transactions conducted via online merchants have been possible for many years. In this type of transaction (known as a card not present or CNP transaction), the user typically enters a first set of authentication credentials that include a primary account number (PAN) of a payment device, an expiry date, and a card verification value (CVV). These credentials are transmitted for verification to an access control server operated by or on behalf of an issuer of the payment device. In some instances, the user may create a profile with the online merchant, in which the above payment information is stored. To complete a transaction, the user enters a second, different, set of authentication credentials in the form of login credentials (including a username and password) that enable them to access their profile, and thus the first set of credentials, to cause the first set of credentials to be transmitted to the access control server of the issuer.

Several difficulties may occur in relation to online transaction environments. In particular, such environments are not currently standardized, such that there is a large amount of variation in implementation, leading to complexity and inconsistency. Further, remote payments are being increasingly targeted by bad actors, and are susceptible to compromise. In addition, users are often required to enter payment data and related checkout data in many places, leading to further risk of data compromise and fraud.

Partly as a result of these difficulties, there has recently been a proposal to standardize online transaction environments, called Secure Remote Commerce (SRC). SRC is a payment platform, including a technical framework and specifications that enable the secure exchange of data for payment transactions. SRC connects customers, merchants, issuers, acquirers, and other entities and enables a merchant to obtain a payload of customer payment information that can be used for payment transaction authorization.

The use of passwords to secure accounts in online transactions has long been a source of frustration to consumers. Additionally, passwords can be compromised, so do not necessarily provide the appropriate level of security to protect consumers and merchants. To enhance transaction security, many e-commerce platforms implement stronger authentication by requiring entry of a one-time passcode (OTP) that is sent to the consumer via an out-of-band channel such as SMS. Although OTP usage has mitigated the security risks associated with passwords, it is still inconvenient for consumers, who need to manually enter the OTP in response to the challenge sent by the e-commerce platform or another entity acting on behalf of the e-commerce platform.

More recently, automatic checkout has emerged as a way for merchants to provide greater convenience to consumers. In automatic checkout, the consumer is identified on entry to the merchant's premises, for example by facial recognition, and sensors are used to track products that are collected by the consumer. A payment account is associated with the consumer's account with the merchant, such that when the consumer leaves the premises, the payment account is automatically charged for the products taken by the consumer.

Current automatic checkout suffers from a significant privacy and security issue, in that biometric data of individuals (such as for use in facial recognition) is stored with a third party and therefore is susceptible to cyber attacks. In addition, the checkout mechanism often cannot handle scenarios such as people having similar facial features, such that consumer identification fails and the consumer is forced to use manual checkout.

It would be desirable to overcome or alleviate one or more of the above-identified issues, or at least to provide a useful alternative.

SUMMARY

The present disclosure relates to a method for validation of identity of a user during a digital payment process, comprising:
  receiving a user identifier;
  determining, based on the user identifier, that the user is enrolled for biometric authentication;
  transmitting, to a mobile device associated with the user identifier, a push notification, said push notification causing an authenticator application executing on the mobile device to initiate a biometric authentication process;
  receiving a result of said biometric authentication process; and
  transmitting authentication data, based on said result, to a transaction initiation system to trigger completion of the SRC checkout process.

For example, the digital payment process may be a secure remote commerce (SRC) checkout process, and the transaction initiation system may be a SRC initiator (SRCI).

In some embodiments, the user identifier is a tokenized user identifier.

The tokenized user identifier may be stored at a facial recognition system in association with biometric data of the user.

In some embodiments, the tokenized user identifier is determined by:
  obtaining sensor data from at least one sensor;
  based on the sensor data, generating a biometric template; and
  matching the biometric template against a database of biometric templates, each biometric template of the database being associated with a tokenized user identifier of a registered user.

In some embodiments, the authentication data are at least partially generated by a biometric API service. At least part of the authentication data may be stored at, or obtained by, the biometric API service.

In some embodiments, the authentication data comprises one or more WebAuthn keys.

The present disclosure also relates to a system for validation of identity of a user during a digital payment process, comprising at least one processor in communication with computer-readable storage having stored thereon instructions to cause the at least one processor to:

receive a user identifier;

determine, based on the user identifier, that the user is enrolled for biometric authentication;

transmit, to a mobile device associated with the user identifier, a push notification, said push notification causing an authenticator application executing on the mobile device to initiate a biometric authentication process;

receive a result of said biometric authentication process; and transmit authentication data, based on said result, to a transaction initiation system to trigger completion of the digital payment process.

In some embodiments of the system, the digital payment process may be a secure remote commerce (SRC) checkout process, and the transaction initiation system may be a SRC initiator (SRCI).

In some embodiments of the system, the user identifier is a tokenized user identifier.

The system may comprise a facial recognition system that stores the tokenized user identifier in association with biometric data of the user.

The system may comprise at least one sensor for capturing sensor data, wherein the facial recognition system comprises a database of biometric templates, each biometric template of the database being associated with a tokenized user identifier of a registered user; and wherein the instructions cause the at least one processor to determine the tokenized user identifier by:

generating a biometric template based on the sensor data; and matching the biometric template against the database of biometric templates.

In some embodiments of the system, the authentication data are at least partially generated by a biometric API service. At least part of the authentication data may be stored at, or obtained by, the biometric API service.

In some embodiments of the system, the authentication data comprises one or more WebAuthn keys.

The present disclosure also relates to non-transitory computer-readable storage having stored thereon instructions for causing at least one processor to perform a method as disclosed herein.

BRIEF DESCRIPTION OF THE DRAWINGS

Embodiments of the present invention will now be described, by way of non-limiting example, with reference to the drawings in which.

DETAILED DESCRIPTION

Embodiments of the invention provide for biometric-based cardholder assurance during digital payments. A benefit of biometric-based assurance in this context is that it provides enhanced security relative to methods such as OTP entry, and is also much more convenient for consumers.

Although specific examples are described below with reference to secure remote commerce (SRC) transactions, it will be appreciated that the invention has broader applicability than this, and that embodiments may be readily adapted for use with other types of digital payment process.

Figure 1:
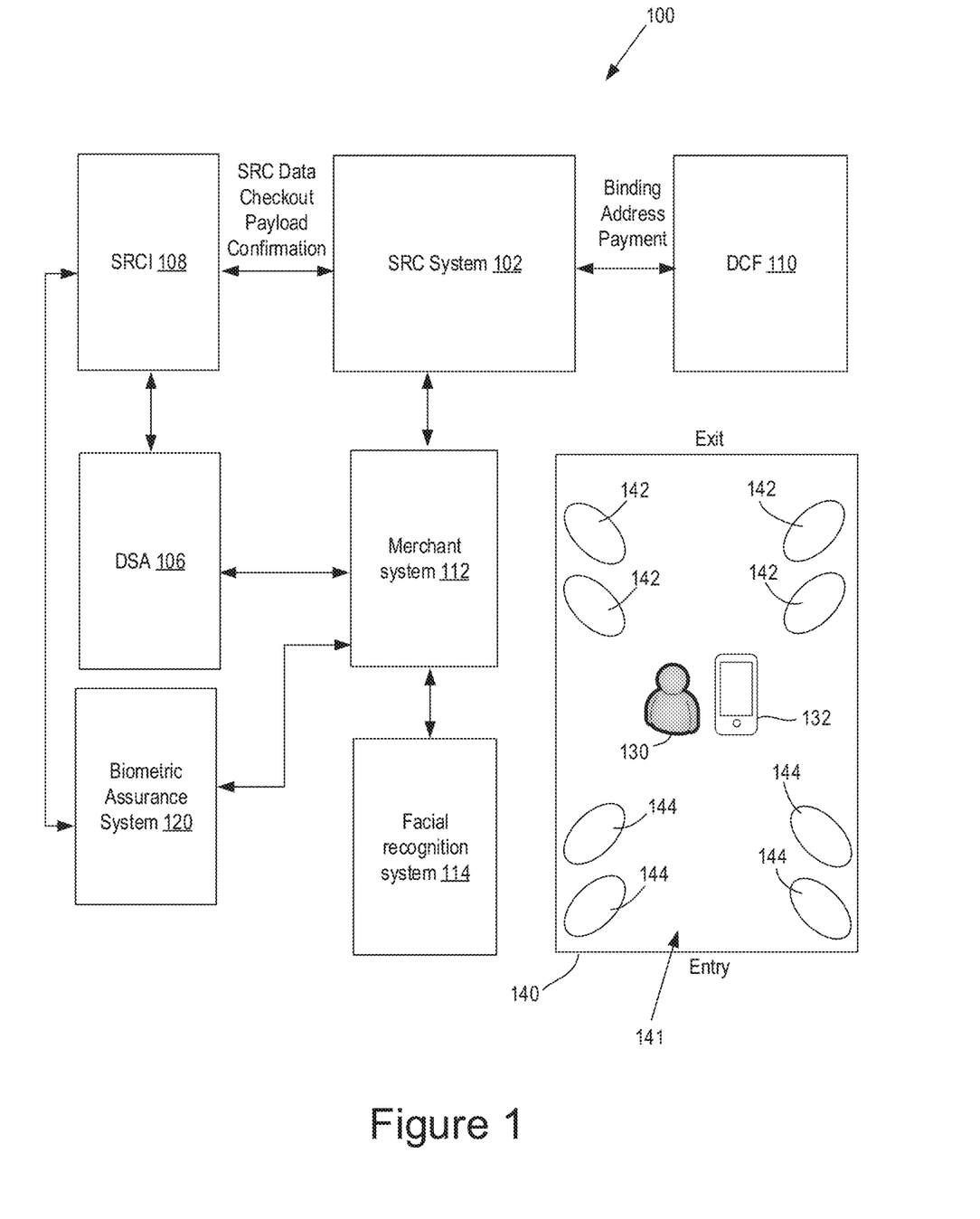
FIG. 1 is a block diagram of an example system for validation of identity of a user during a digital payment process.

FIG. 1 is a high-level block diagram of a transaction system 100 according to some embodiments of the present invention. In particular, the system 100 includes a number of components that interact as described herein to allow transactions to be completed. In general, many of the interactions between components are via application programming interfaces ("APIs") which will be described further herein. In particular, the system 100 enables initiation of secure checkout, with improved assurance via biometric authentication, in a secure remote commerce (SRC) framework. Reference is made to the following documents:

(1) EMV Secure Remote Commerce Technical Framework (version 1.0, October 2017); and (2) EMV Secure Remote Commerce Specification (version 1.0, May 2019).

Each of documents (1) and (2) is available from www.emvco.com, and the disclosure of each is hereby incorporated by reference in its entirety as if fully set forth herein.

The transaction system 100 comprises a SRC system 102 that generally operates to orchestrate messages and transactions between transaction participants using the API methods described further herein. In some embodiments, a number of SRC systems 102 may be in the system 100. Each of the SRC systems 102 may be operated by or on behalf of different entities to facilitate transactions. For example, each SRC system 102 may be operated by, for example, a payment network (such as Mastercard International Incorporated or other network providers). Other entities may also operate SRC systems 102. Each SRC system 102 coordinates messages and transactions among transaction participants (including a mobile device 132 of consumer 130, a Digital Shopping Application (DSA) 106, a transaction initiation system in the form of a Secure Remote Commerce Initiator (SRCI) 108, and a Digital Card Facilitator (DCF) 110) in order to facilitate remote card payments pursuant to the present invention. A number of the messages and interactions facilitated by the SRC system 102 will be described by reference to transaction flows in FIGS. 2 to 5 discussed further below. While the SRC system 102, the DSA 106, the SRCI 108 and the DCF 110 are generally referred to herein as "participants" or "components" they may also be generally described as "roles". For example, the role of the DCF 110 may be performed by an application that may be a part of a larger application that also performs the role of the SRCI 108.

The transaction system 100 may also, in at least some embodiments, comprise a biometric API service 120 (illustrated in the Figures as "biometric assurance system 120") that is responsible for enrollment of consumers 130 for biometric authentication during SRC checkout. Biometric API service 120 may conduct enrollment and authentication on behalf of SRC system 102, for example.

In some embodiments, the transaction system 100 may operate to enable consumer 130 having mobile device 132 to complete an automated SRC checkout (or other type of digital payment process) in an in-store environment 140. The in-store environment 140 may be operated by a merchant that also operates a merchant system 112 which is in communication with components of the in-store environment 140, as well as SRC participants such as SRCI 108 and/or SRC system 102, and mobile device 132. The in-store environment may have sensors, such as forward-facing cameras 142 and rear-facing cameras 144, that identify the presence of the consumer 130 as she passes through a checkout area 141 of the in-store environment 140. The consumer 130 may be enrolled for biometric recognition (e.g., facial recognition via the cameras 142 and/or 144), such that her purchases can be associated with mobile device 132 for SRC checkout to be initiated and completed at the mobile device 132, as will be described below. To this end, merchant system 112 communicates with a facial recognition system 114 that receives and processes images from cameras 142, 144, and identifies registered consumers 130 based on biometric data previously stored with consumer consent at the facial recognition system 114.

The DCF 110 is generally operated to provide a user experience for consumers during a transaction. More particularly, the DCF 110 provides consumers with a user interface (or portions of a user interface) that may be used during a checkout process and/or for card management (when card data is stored in the consumer's profile or the SRC profile at an SRC system 102). For example, the DCF 110 may provide user interfaces (or portions thereof) to facilitate billing address entry, shipping address entry and selection, consumer profile creation, binding of payment cards and addresses to SRC profiles, as well as user interfaces to facilitate consumer/payment assurance challenges (e.g., such as for use with 3D Secure authentication processes or the like). A number of DCFs 110 may be in the system 100. Each of the DCFs 110 may be operated by or on behalf of different entities. For example, a DCF 110 may be operated by an entity that also operates an SRC system 102. As another example, a DCF 110 may be operated by or on behalf of an financial account issuer, a merchant, a browser provider, or the like.

The SRCI 108 is generally operated to facilitate the collection and transmission of digital card and checkout information on behalf of a DSA 106 to enable the initialization of a payment transaction. The SRCI 108 in some embodiments is responsible for securely exchanging data with a SRC system 102 (including providing checkout data to the SRC system 102). The SRCI 108 also securely receives payload information from the SRC system 102 for use in completing a payment transaction using that payload. In some embodiments, a number of SRCIs may be provided in a system 100. Each SRCI 108 may be operated, for example, by or on behalf of a merchant system 112 (e.g., such as by a merchant service provider or the like).

Alternative forms of transaction initiation system may function in place of the SRCI 108, to receive transaction-specific information, payment credentials, and biometric authentication data, for forming transaction messages to transmit to a payment network and/or other components of standard payment system architecture. For example, a payment service provider (PSP), payment gateway, digital wallet server, or acquirer processor system (or a combination of any two or more of these) may function in this manner. Other transaction initiation systems are also possible, as will be appreciated by those skilled in the art.

The DSA 106 is generally operated to facilitate the consumer experience during a secure commerce transaction. A DSA 106 may be, for example, a web or mobile application to allow a consumer to purchase goods or services from a merchant, marketplace or other service provider. A number of DSAs are typically provided in a system 100. Each DSA 106 may be operated by, or on behalf of, a merchant, a marketplace, or a service provider that operates to maintain, administer and manage hosted order pages on behalf of merchants or marketplaces. The DSA 106 is not necessarily limited to shopping applications, it may also be an application to facilitate other types of payment transactions (and thus, may also be referred to as a digital payment application (or "DPA")).

As shown in FIG. 1, a number of message types are shown as passing between different entities or devices. These message types are shown for illustrative purposes and more detailed information about messages will be provided in conjunction with a discussion of FIGS. 2 to 5. Messages between the SRCI 108 and the SRC system 102 include SRC data and checkout data. This information may include, for example, profile data (including, for example DSA information), credentials to facilitate the secure exchange of data, consumer data (such as the consumer's email and mobile number), shipping information, transaction information and user device information. Other messages between the SRCI 108 and SRC system 102 include payload data which is created by the SRC system 102 and sent to the SRCI 108 to enable payment authorization to be performed. The payload data may include consumer information (such as, for example, email and phone number), information identifying the digital card selected for use in the transaction by the user, shipping address information, consumer verification response data, transaction information, etc. A confirmation API method may allow an SRCI 108 to notify the SRC system 102 about the status or outcome of the transaction (and may include a transaction identifier as well as a status or status code).

As shown in FIG. 1, there are a number of message flows that involve user interfaces provided by the DCF 110. For example, when a consumer profile is created or updated or when device or consumer information is bound to a profile, the DCF 110 may be involved to provide an appropriate user interface for the interaction. Other services that may involve user interfaces from the DCF 110 include a payment service which may be used to request the generation of transaction credentials which can be used to transact through an acquiring channel (e.g., in an authorization request). The payment service may include identification information (such as the appInstanceIdentifier) as well as input parameters to generate transaction credentials (such as the consumer's selected cardId, a shippingAddressId, a transaction amount and other optional information). In response, a transactionId is provided to identify the transaction as well as an expiration date of the transactionId. Another example of interactions that may involve user interfaces from the DCF 110, are binding interactions when a consumer's identifier and other consumer contact details are bound (or associated with) to an enrolled card or to an established customer account profile, identified by an appInstanceIdentifier. A message to bind a device to a consumer was described above. As another example, a bind consumer method may be invoked (typically by a DCF 110) and may include the appInstanceIdentifier, and may optionally include an appInstanceAuthorization JWT object or a cardAuthorization JWT object. If the cardAuthorization is provided it is used to validate the session and identify the card to which the consumer details should be bound (and will attempt to create a new customer account profile on the SRC system 102). Otherwise, if appInstanceAuthorization is provided it is used to identify the existing customer account profile to which the supplied customer details should be bound. If an authorization object is not included in the request header, then the appInstanceIdentifier must be provided. If both the appInstanceIdentifier and an authorization object are provided, both must map to the same customer profile. The result of the use of these various combinations of authorizations and identifiers (such as the appInstanceIdentifier) is a system that allows a wide variety of disparate entities to securely participate and communicate with each other.

SRCI 108 may integrate an SRC Mark on a checkout or payment page of a Digital Shopping Application 106 to enable an SRC Experience resulting in SRC Payload data. SRC Initiators may have their own Digital Shopping Application 106 or may have a relationship with one or more Digital Shopping Application providers. SRC Initiator 108 may interact and interface with one or more SRC System(s) 102.

In some embodiments, an SRC mark may be a graphical user interface element, such as a button or an image associated with or embedding a hyperlink, that may be interacted with by a user to trigger a service request, such as a request to initiate a checkout process. The SRC mark may carry indicia (such as one or more logos and/or text) that indicate one or more entities, such as SRCI 108, DCF 110, SRC system 102 and/or a payment scheme/network, that will be used to process the service request. For example, different SRC marks may represent different digital wallet operators, and the user may select the SRC mark that corresponds to their digital wallet operator of choice. In other embodiments, the SRC mark may simply be indicia that indicate to a user of a merchant site that SRC checkout is available at the merchant site.

Responsibilities of the SRCI 108 may include, but are not limited to:
  On-boarding and integrating with one or more SRC System(s) 102 and their common interfaces
  Receiving credentials from each SRC System 102 to securely exchange data
  Rendering SRC Mark(s)
  Securely providing SRC Checkout data to SRC System(s) 102
  Securely receiving SRC Payload data from SRC System(s) 102 to facilitate transaction processing in accordance with established SRC Programme, Payment System and Payment Network transaction processing requirements using their existing payment processor and acquiring provider
  Providing User Confirmation to SRC System(s) 102
  Indicating value added services requested to the SRC System 102 which may include Payment Tokenization and 3-D Secure authentication Entities which provide payment services on behalf of merchants can be SRC Initiators in their own right. Such entities indicate which merchant they are servicing by providing the appropriate profile data.

An SRCI 108 may be, for example, a merchant, an acquirer, a payment gateway, or a payment service provider (PSP).

The DCF 110 stores or accesses Digital Card instances of primary account numbers (PANs) of users. The data stored by DCF 110 to support an SRC Experience includes:

A Payment Token or PAN Reference
A visual representation of the Payment Card
User identity
The data stored may include User Device information.
The functions enabled by DCF 110 may include, but are not limited to:
  On-boarding and integration with one or more SRC System(s) 102
  Secure distribution of payment related data to the SRC System Enrollment of Digital Card credentials established by the Card Issuer
  Identification of a consumer 130 and a mobile device 132 to facilitate access to Cardholder data
  Verification of the relationship between the consumer and consumer device and providing related results
  Facilitation of the procurement of User Payment Data
  Secure exchange of data with the SRC System 102
  Proper and secure storage and maintenance of Digital Card, User Personal Account Information (PAI) and Personally Identifiable Information (PII) data
  Secure distribution of value added service related data
  Support of required SRC ecosystem interactions and interfaces Digital Card Facilitator enablement may include either inline access directly to Card Issuer systems or maintenance of a container known as a digital wallet that stores data outside of a Card Issuer system and that is accessed through an established credential.

A DCF 110 may be, for example, a payment network (such as Mastercard), a browser, an issuer, or a merchant.

Although not explicitly shown in FIG. 1, other participants in transactions pursuant to embodiments of the present invention are one or more financial institutions that function as acquirers or issuers of payment accounts that are used by consumers participating in secure remote commerce transactions pursuant to the present invention. Issuers operate to enroll the consumer (also referred to herein as a "cardholder") and one or more payment account numbers (or "PANS") of the consumer. Acquirers perform the standard payment function of performing authorizations of transactions involving payment accounts issued by that issuer.

The SRC system 102 and/or the other elements of the system 100 might be, for example, associated with a Personal Computer ("PC"), laptop computer, smartphone, an enterprise server, a server farm, and/or a database or similar storage devices. As used herein, devices, including those associated with the SRC system 102 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks. Note that the system 100 of FIG. 1 is provided only as an example, and embodiments may be associated with additional elements or components.

Figure 2:
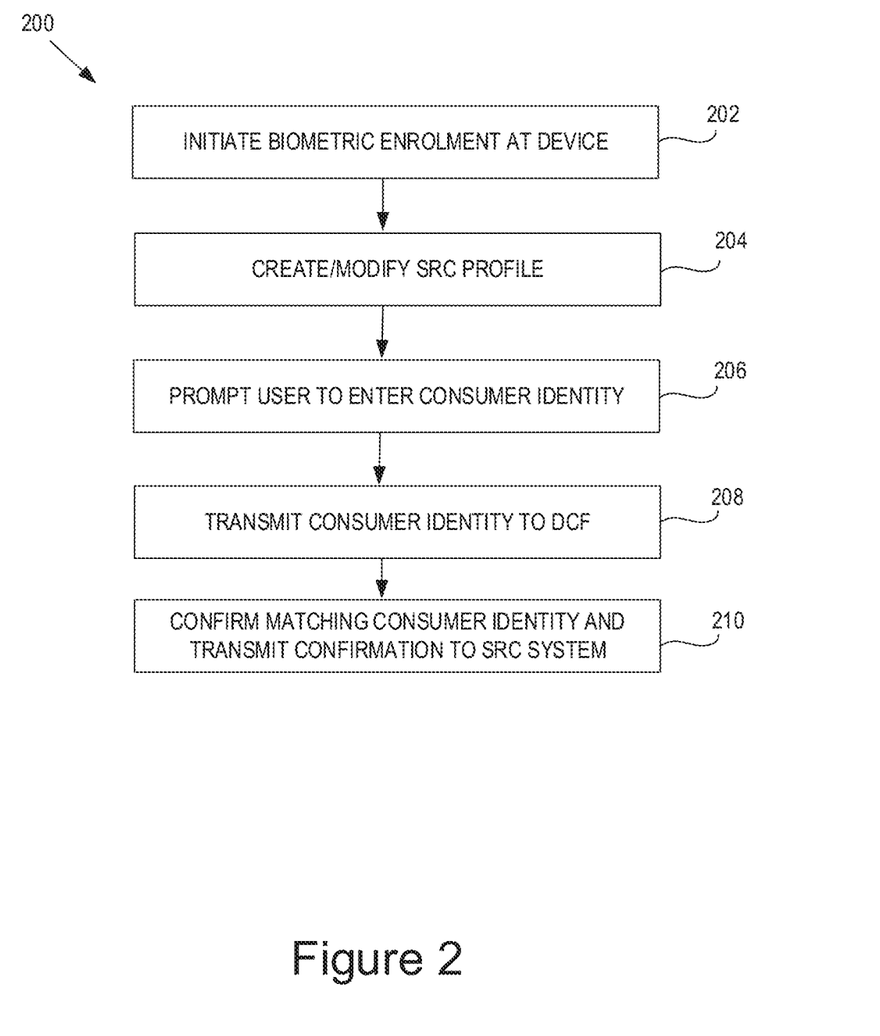
FIG. 2 is a flow diagram of an example process for enrolling a user for biometric authentication in a digital payment process.

Reference is now made to FIG. 2 which illustrates an enrollment process 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

In general, a digital payment process such as an SRC checkout process involves a number of sub-processes, for example including SRC identification collection, SRC recognition, DCF discovery, payment collection, payment delivery, and confirmation management. One or more of these sub-processes may involve the use of an assurance process to ensure that SRC participants requesting access to payment data have been granted permission to do so by the consumer to whom the payment data corresponds. In particular, the SRC recognition phase of SRC checkout may require such an assurance process. Embodiments of the present invention improve security of the assurance process by requiring biometric authentication of the consumer, rather than password or PIN entry. This improves security while also simplifying user interaction with the mobile device during authentication, since only a single action (such as presenting a finger to a fingerprint sensor, or the user's face to a camera for iris scanning or facial recognition) is typically required.

In order to enable biometric authentication, consumers may be enrolled as part of an SRC enrollment process when a consumer adds a new PAN to SRC system 102. Alternatively, enrollment may be implemented via a biometric authentication platform outside of the usual SRC enrollment flow.

In one example, as depicted in FIG. 2, an enrollment process 200 comprises an operation 202 in which a DCF 110 transmits an enrollment request message to an SRC system 102. 202 may be triggered by a wallet application and/or authenticator application executing on a mobile device 132 of a consumer 130, and communicating with DCF 110, for example. The enrollment request message may comprise binding data such as a consumer identity. The consumer identity may be a unique value such as a name, an email address or a mobile phone number, provided by the consumer and used as a key for recognition or index to an SRC profile.

The enrollment request may be transmitted on behalf of an SRC participating issuer (SRCPI, not shown in FIG. 1), and the SRCPI may specify biometrics as the issuer preference for cardholder assurance.

At 204, the SRC system 102 receives the enrollment request message, and sends a response to the DCF 110, resulting in the creation or modification of an SRC profile at the DCF 110, such that the PAN is associated with the consumer identity (and optionally with a device identifier of the mobile device from which the enrollment request originated) in the SRC profile.

At 206, the DCF 110 transmits a notification to the mobile device, prompting the user to enter the same consumer identity that is associated with the SRC profile.

At 208, the user enters the consumer identity in the wallet application or authenticator application, and this is transmitted to the DCF 110.

At 210, the DCF 110 checks the response received from the user's mobile device 132, and if it matches the consumer identity on record, sends a successful enrollment message to the SRC system 102. Accordingly, when the same SRC profile is used for checkout, the SRC system 102 can recognize that the consumer is enrolled for biometric authentication (for example, for the particular DCF 110 with which enrollment was performed), and can require this as assurance during an SRC checkout process.

Figure 3:
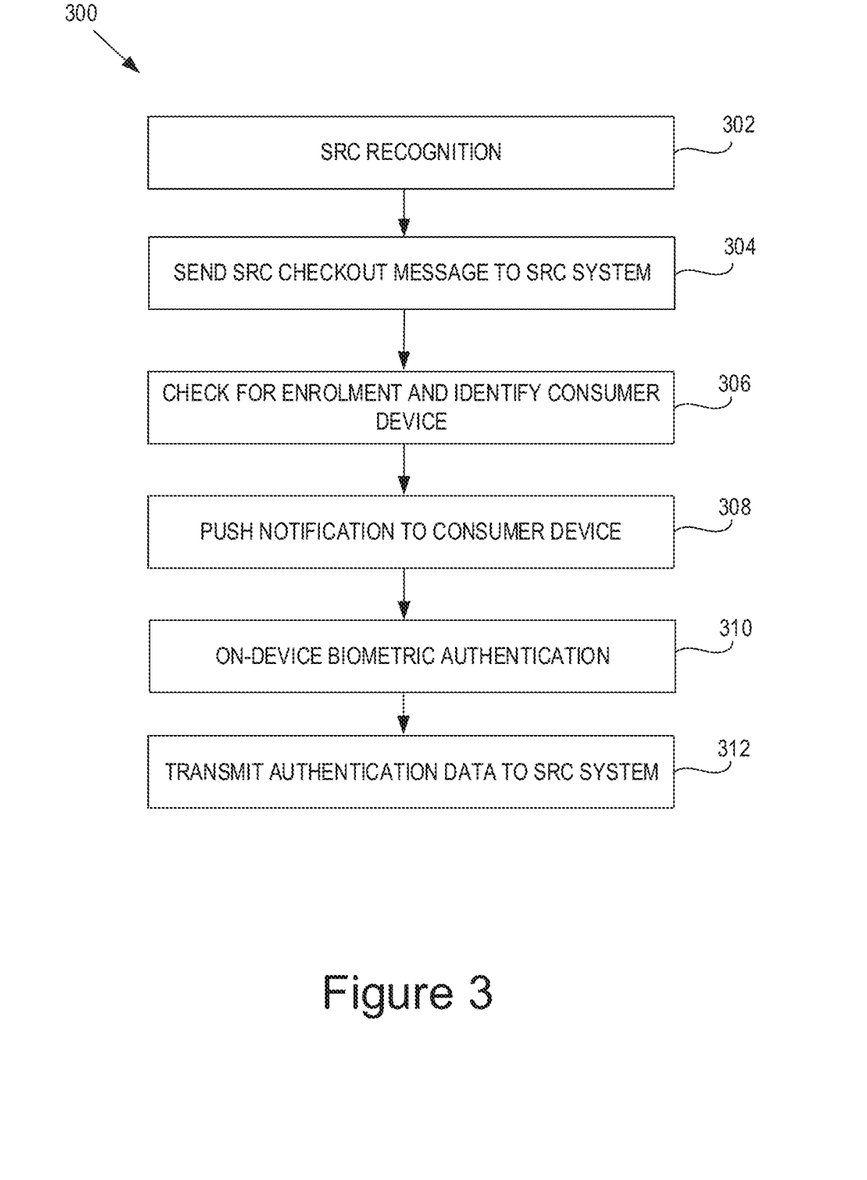
FIG. 3 is a flow diagram of an example method of validation of identity of a user during a digital payment process.

Turning now to FIG. 3, an example method 300 of validation of identity of a user during a digital payment process, such as a secure remote commerce (SRC) checkout process, is shown.

At 302, the SRC system 102 may interact with one or more SRC participants to execute standard SRC processes such as event recognition, consumer recognition and/or device recognition. Following this, at 304, an assurance process is initiated, in which the SRC system 102 receives an SRC checkout message that contains a consumer identity.

At 306, the SRC system 102 (or other entity responsible for orchestrating messages and transactions between system participants) determines the consumer identity from the SRC checkout message, and checks whether the consumer identity is registered for biometric authentication. As part of this step, the SRC system 102 also identifies a mobile device 132 associated with the consumer 130.

At 308, the SRC initiator 108 (or other transaction initiation system) sends a push notification to the identified mobile device 132.

At 310, the identified device 132 receives the push notification, thereby triggering a biometric authentication process, for example within a digital wallet application or authenticator application executing on the mobile device 132.

At 312, on successful biometric authentication, the mobile device 132 (again, via the digital wallet application or authenticator application for example), transmits the authentication result to the SRC system 102. For example, the mobile device 132 may transmit the authentication result to DCF 110, which then forwards the result to SRC system 102. The SRC system 102 may then allow access to the SRC profile of consumer 130 by the SRC participant that requested access for checkout (for example, SRCI 108).

Figure 4:
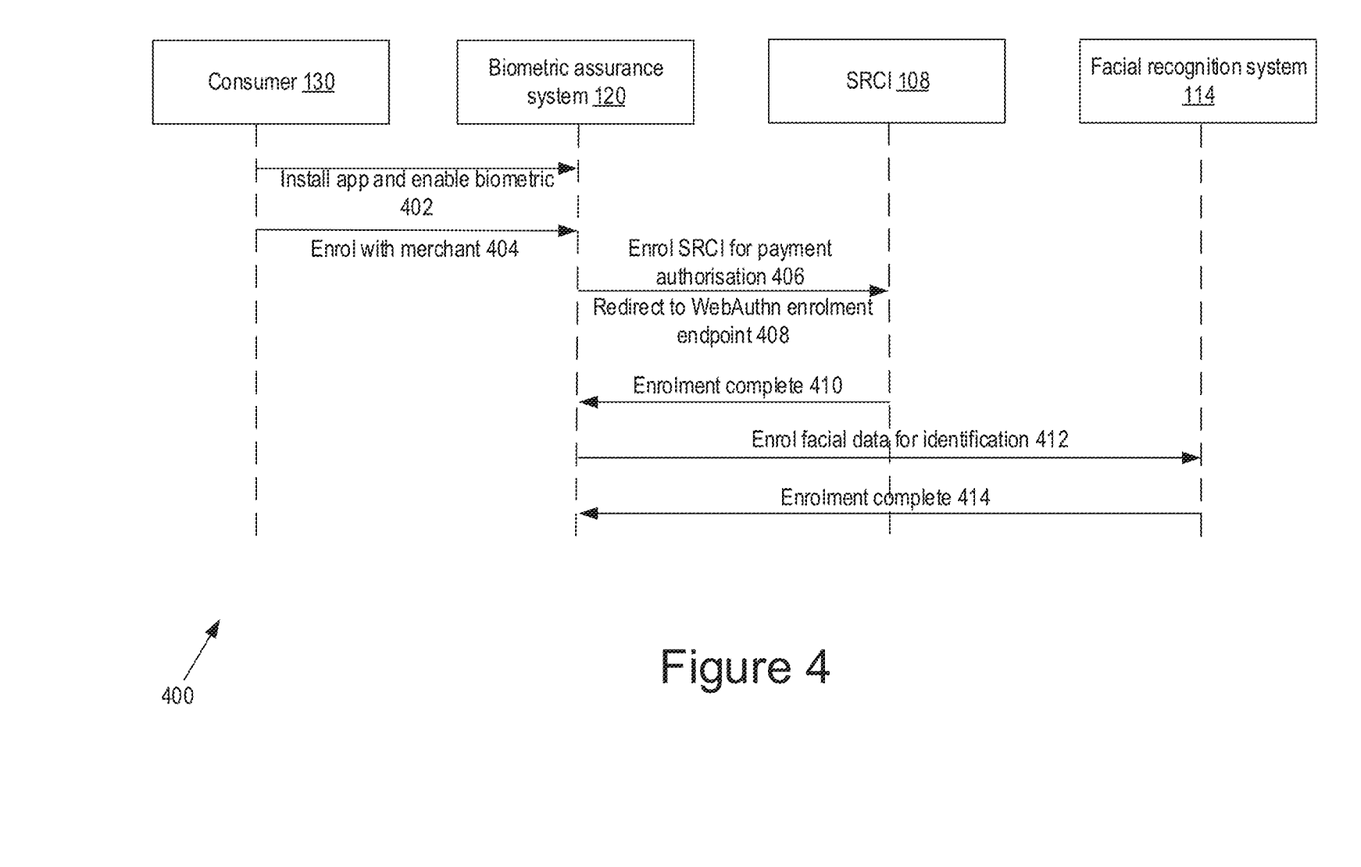
FIG. 4 is a swimlane diagram of an example sequence of data flows during enrollment of a user in the process of FIG. 2.

Turning now to FIG. 4, another example process 400 for enrolling a consumer for biometric assurance during a digital payment process, such as SRC checkout, is shown. The process 400 is implemented by, amongst other entities, a biometric API service 120 that may provide API access for payment initiation via SRC, and payment instrument tokenization. To this end, SRCI 108 may be registered with the biometric API service 120 for said API access. Biometric API service 120 may also provide access to consumers 130 by providing the back end systems (such as an application server) and processes for an authenticator application 819 (FIG. 6) that can be installed on mobile device 132 for on-device biometric authentication of consumer 130. In some embodiments, the authenticator application 819 may be provided by SRCI 108. In yet further embodiments, multiple authenticator applications may be provided by different SRCIs, and/or by the biometric API service 120.

For the purposes of the enrollment process of FIG. 4, it is assumed that merchants, such as the operator of merchant system 112, are registered with the biometric API service 120, and are paired with at least one SRCI 108, such that payment requests initiated by or on behalf of consumers 130 can be forwarded to an SRCI 108 for processing.

At 402, the consumer 130 downloads and installs an SRC authenticator application 819 on their mobile device 132. Consumer 130 then launches the authenticator application 819 and logs in to SRCI 108 to enable access to their SRC profile maintained by SRC system 102. If consumer 130 is not already registered with the SRC system 102, this may trigger an enrollment process such that the consumer 130 can enroll a payment card and shipping address and have an SRC profile created. If consumer 130 has an existing SRC profile and has chosen not to be remembered by the SRC system 102, this may cause the authenticator application to require consumer 130 to enter the enrolled consumer ID (such as email address or mobile phone number) to receive a one-time password that should be entered to proceed. If consumer 130 has previously enrolled with SRC system 102 and has chosen to be remembered, generation and entry of the one-time password may be skipped. In this case, the consumer 130 may be recognized by means of a cookie stored at mobile device 132.

At 404, the consumer 130 then pairs with the merchant, by selecting the merchant from a list of those who have registered with the biometric API service 120. The list may be maintained by SRC initiator 108, and displayed within the SRC authenticator application 819.

For example, if consumer 130 is in an in-store environment 140 (such as physical store) of the merchant, the merchant system 112 may detect the consumer 130's presence via Bluetooth or 5G, and trigger the pairing process by sending a notification to mobile device 132. Alternatively, consumer 130 may trigger the pairing process themselves by scanning a QR code before entering the in-store environment 140 for the first time. The consumer 130 could also trigger the pairing process by manually searching for and selecting the merchant from the SRC authenticator application 819, and agreeing to legal terms/conditions that allow capture/transmission of facial recognition data for the purpose of in-store identification.

At this stage, the biometric API service 120 may associate the consumer's 130 ID with the merchant. In some embodiments, a proxy value (token) can be associated with the merchant, rather than the actual consumer ID, for security reasons. Accordingly, the merchant may have access to the proxy value, but not to the actual consumer ID.

At 406, the biometric API service 120 and enrolls the SRCI 108 for payment authorization. For example, the SRC authenticator application may generate a key pair that is privately stored on the user's mobile device 132 (preferably by a hardware-based key manager, such as a secure enclave), and use the generated key pair to enroll itself as a WebAuthn token that can allow consumer 130 to authenticate via the SRC authenticator application to the SRCI 108.

At 408, the biometric API service 120 causes redirection of the authenticator application or a web browser executing on mobile device 132 to a WebAuthn enrollment endpoint associated with the SRCI 108 of the selected merchant.

Next, at 410, the WebAuthn endpoint may generate a key pair for the consumer 130. The key pair is stored at mobile device 132, preferably in a hardware-based key manager such as a secure enclave. The public key of the key pair may be transmitted to the SRCI 108.

SRC system 102 may prompt consumer 130 to add the authenticator application as a WebAuthn authenticator that allows login to the SRC system 102 as the consumer 130's SRC profile. To this end, a WebAuthn token is associated with SRCI 108 for the purpose of logging in to consumer 130's SRC profile.

At 412, the SRCI 108 receives confirmation from the SRC system 102 that the consumer 130 has been enrolled for authentication via WebAuthn, and returns a confirmation message to the biometric API service 120.

Next, at 414, the biometric API service 120 may prompt consumer 130, via the authenticator application, to enroll for facial recognition for a given merchant, such that automated checkout can be performed at the merchant. If the consumer 130 elects to proceed, the authenticator application 819 may redirect to the merchant's webpage (e.g., served by merchant system 112), transmitting the consumer 130's tokenized consumer ID (as generated by SRCI 108) as part of the redirect request. The merchant's webpage may contain instructions to submit biometric data to the merchant system 112's facial recognition system 114.

At 416, the facial recognition system 114 stores the consumer 130's biometric data, in association with the tokenized consumer ID. This enables the consumer 130 to be identified as a registered (with the merchant) consumer on entry into the in-store environment 140, and for the merchant system 112 to use the tokenized consumer ID to trigger payment authentication, but without unveiling the consumer's actual identity (for example, their email address or phone number). This is because the tokenized consumer ID is specific to the merchant with which they have registered, and becomes meaningless outside transactions that are carried out with that merchant.

Figure 5:
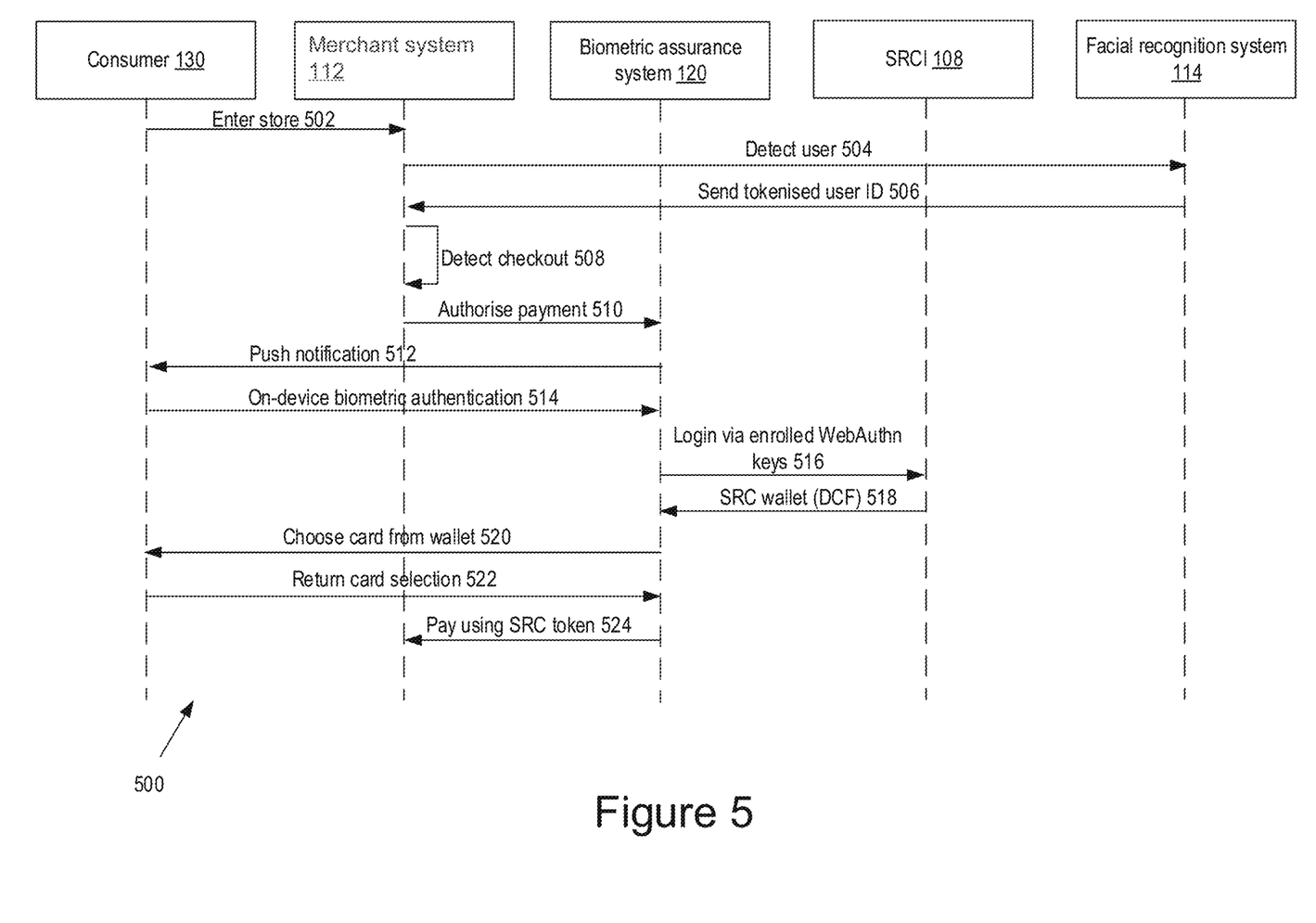
FIG. 5 is a swimlane diagram of an example sequence of data flows during the method of FIG. 3.

Turning now to FIG. 5, an example payment flow 500 for an enrolled consumer 130 is shown. Consumer 130 is associated with mobile device 132 which may perform at least some of the steps shown as being associated with consumer 130 in FIG. 5.

At 502, the consumer 130 enters the in-store environment 140 of a merchant with which she has previously registered for automated checkout (for example, by a process in accordance with enrollment process 400).

At 504, the merchant system 112 detects the consumer 130. For example, one or more forward facing cameras 142 may capture images of the consumer 130's face as she enters the checkout area 141 of in-store environment 140. The images may be transmitted to facial recognition system 114 for matching (in known fashion) against biometric templates of registered consumers that are stored in association with the merchant at the facial recognition system 114.

Following detection operation 504, a tokenized consumer ID of a matched consumer may be transmitted from facial recognition system 114 to merchant system 112, at 506.

At 508, the merchant system 112 detects a checkout initiation associated with the tokenized consumer ID received at 506. For example, merchant system 112 may receive ongoing updates (based on data from cameras 142, 144) regarding location of consumer 130 within in-store environment 140, and may also detect devices that are proximate consumer 130, for example by use of Bluetooth beacons, signals from wireless access points, and the like. Sequences of images captured by cameras 142 and/or 144 may indicate that consumer 130 is approaching an exit of the checkout area 141, for example, automatically triggering a checkout for consumer 130.

At 510, the merchant system 112 transmits a request to authorize payment to the biometric API service 120. The request includes the tokenized consumer ID of consumer 130.

At 512, the biometric API service 120 receives the request, maps the tokenized consumer ID to the actual consumer ID, determines a device ID of the consumer 130, and transmits a push notification to the consumer 130's mobile device 132. The push notification may be an in-app notification within the authenticator application installed on the mobile device 132, for example. The push notification prompts the consumer 130 to complete on-device biometric authentication, for example via facial recognition, iris scan, or fingerprint recognition.

Once on-device biometric authentication is completed successfully, the authenticator application transmits a notification, at 514, to biometric API service 120.

At 516, the biometric API service 120 retrieves the WebAuthn key pair for consumer 130, based on the consumer ID, and performs a WebAuthn login to SRCI 108 using the key pair. Once logged in, the consumer 130 is redirected to DCF 110 to retrieve details of payment instruments stored in association with their SRC profile. Those details are returned to biometric API service 120, at 518.

At 520, the details of the payment instruments are transmitted from biometric API service 120 to mobile device 132 so that consumer 130 can select the payment instrument to be used to complete checkout.

At 522, the selection made by consumer 130 is transmitted from mobile device 132 to biometric API service 120.

At 524, biometric API service 120 transmits an SRC token to merchant system 112. The merchant system 112 may then generate, or cause to be generated (e.g. by a payment gateway), an authorization request using the SRC token, and the payment then proceeds in conventional fashion.

Figure 6:
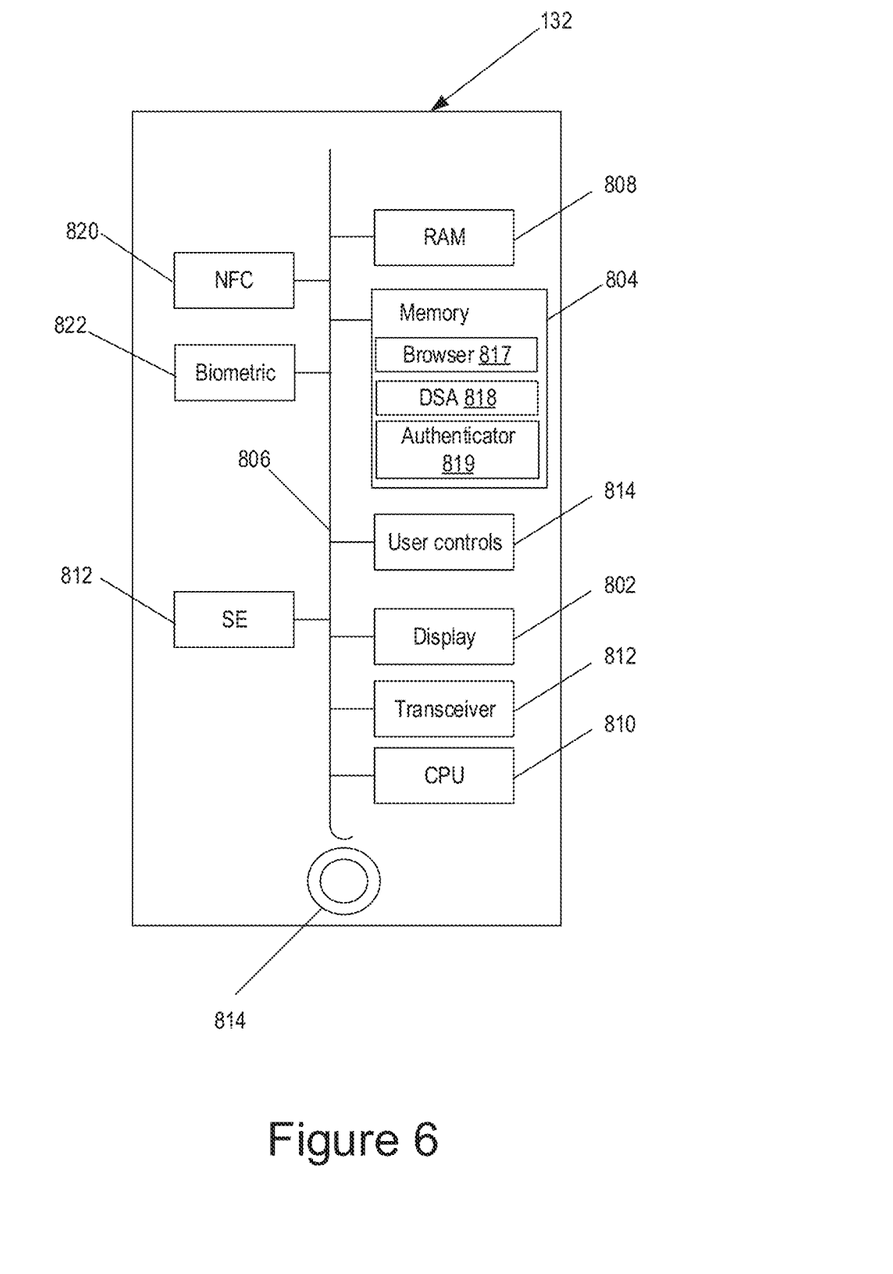
FIG. 6 is an exemplary architecture of a mobile device suitable for implementing some embodiments.

FIG. 6 shows an exemplary architecture of a mobile device 132 that may be used in implementation of embodiments of the invention. The mobile device 132 may be a mobile computer device such as a smart phone, a tablet, a personal data assistant (PDA), a palm-top computer, and multimedia Internet enabled cellular telephones.

As shown, the mobile device 132 includes the following components in electronic communication via a bus 806:
  (a) a display 802;
  (b) a non-transitory computer readable-medium (non-volatile memory) 804;
  (c) random access memory ("RAM") 808;
  (d) N processing components 810;
  (e) a transceiver component 812 that includes N transceivers;
  (f) user controls 814;
  (g) a secure element 816;
  (h) a NFC controller 820; and
  (i) one or more biometric sensors 822.

In some embodiments, the secure element 816 may be within the same chip package as a main processor of the N processing components 810, in which case it is referred to as a secure enclave.

Although the components depicted in FIG. 6 represent physical components, FIG. 6 is not intended to be a hardware diagram. Thus, many of the components depicted in FIG. 6 may be realized by common constructs or distributed among additional physical components. Moreover, it is certainly contemplated that other existing and yet-to-be developed physical components and architectures may be utilized to implement the functional components described with reference to FIG. 6.

The display 802 generally operates to provide a presentation of content to a user, and may be realized by any of a variety of displays (e.g., CRT, LCD, HDMI, micro-projector and OLED displays).

In general, the non-transitory computer readable-medium 804 (also referred to as non-volatile memory 804) functions to store (e.g., persistently store) data and executable code.

In some embodiments for example, the non-volatile memory 804 includes bootloader code, modem software, operating system code, file system code, and code to facilitate the implementation components, known to those of ordinary skill in the art, which are not depicted nor described for simplicity. For example, the non-volatile memory 804 may contain a web browser 817, a digital shopping application (DSA) 818, and an authenticator application 819.

In many implementations, the non-volatile memory 804 is realized by flash memory (e.g., NAND or ONENAND memory), but it is certainly contemplated that other memory types may be utilized as well. Although it may be possible to execute the code from the non-volatile memory 804, the executable code in the non-volatile memory 804 is typically loaded into RAM 808 and executed by one or more of the N processing components 810.

The N processing components 810 in connection with RAM 808 generally operate to execute the instructions stored in non-volatile memory 804. As one of ordinarily skill in the art will appreciate, the N processing components 810 may include a video processor, modem processor, DSP, graphics processing unit (GPU), and other processing components.

The transceiver component 812 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a CPRS network, a UMTS network), and other types of communication networks.

The mobile device 800 can execute mobile applications, such as a digital shopping application (DSA) 818. The DSA 818 could be a mobile application, web page application, or computer application. The DSA 818 may be accessed by a computing device such as mobile device 800, or a wearable device such as a smartwatch.

Authenticator application 819 enables mobile device 132 to communicate with biometric API service 120 to enable more efficient login to SRC system 102, for example via WebAuthn as described above in relation to FIGS. 4 and 5.

It should be recognized that FIG. 8 is merely exemplary and in one or more exemplary embodiments, the functions described herein may be implemented in hardware, software, firmware, or any combination thereof. If implemented in software, the functions may be transmitted or stored as one or more instructions or code encoded on a non-transitory computer-readable medium 804. Non-transitory computer-readable medium 804 includes both computer storage medium and communication medium including any medium that facilitates transfer of a computer program from one place to another. A storage medium may be any available medium that can be accessed by a computer.

Figure 7:
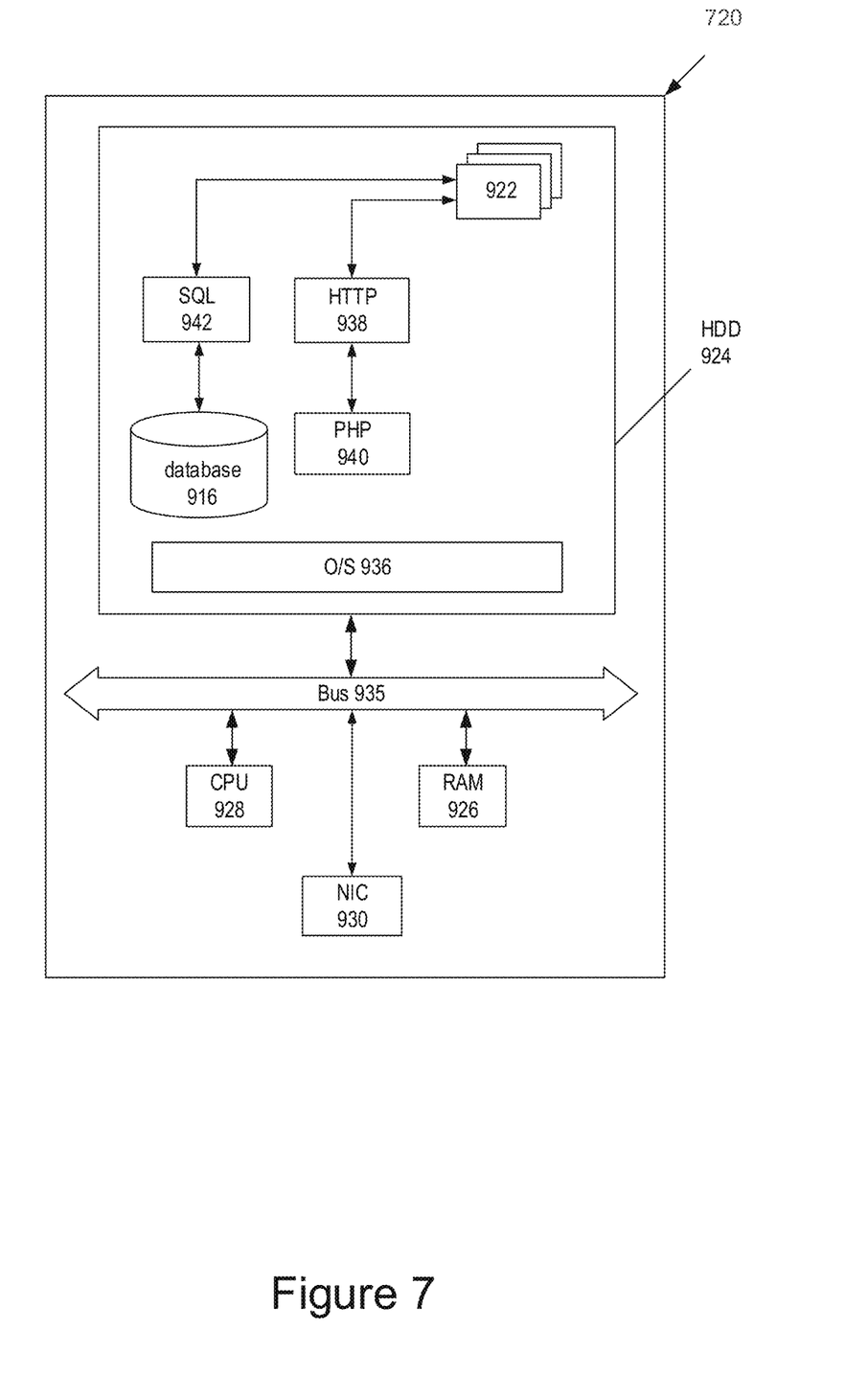
FIG. 7 is an exemplary architecture of a computing device for implementing a biometric API service according to certain embodiments.

FIG. 7 shows an example computing device 720 that is capable of implementing a biometric API service (or at least part thereof).

The components of the computing device 720 can be configured in a variety of ways. The components can be implemented entirely by software to be executed on standard computer server hardware, which may comprise one hardware unit or different computer hardware units distributed over various locations, which may communicate over a network. Some of the components or parts thereof may also be implemented by application specific integrated circuits (ASICs) or field programmable gate arrays.

In the example shown in FIG. 7, the computing device 720 is a commercially available server computer system based on a 32 bit or a 64 bit Intel architecture, and the processes and/or methods executed or performed by the computing device 720 are implemented in the form of programming instructions of one or more software components or modules 922 stored on non-volatile (e.g., hard disk) computer-readable data storage 924 associated with the computing device 900. At least parts of the software modules 922 could alternatively be implemented as one or more dedicated hardware components, such as application-specific integrated circuits (ASICs) and/or field programmable gate arrays (FPGAs).

The computing device 720 includes at least one or more of the following standard, commercially available, computer components, all interconnected by a bus 935:
(a) random access memory (RAM) 926;
(b) at least one computer processor 928, and
(c) a network interface connector (NIC) 930 which connects the computer device 900 to a data communications network (such as network 20) and/or to external devices.

The computing device 720 includes a plurality of standard software modules, including:
(a) an operating system (OS) 936 (e.g., Linux or Microsoft Windows);
(b) web server software 938 such as Apache, available at http://www.apache.org;
(c) scripting language support 940 such as PHP, available at http://www.php.net, or Microsoft ASP; and
(d) structured query language (SQL) modules 942 (e.g., MySQL, available from http://www.mysql.com), which allow data to be stored in and retrieved/accessed from an SQL database 916.

The database 916 may form part of the computer readable data storage 924. Alternatively, the database 916 is located remote from the computing device 900 shown in FIG. 7.

The boundaries between the modules and components in the software modules 922 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the invention. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagrams of those parts of the processes 400 and 500 performed by the biometric API service 120 may be executed by a module (of software modules 922) or a portion of a module. The processes may be embodied in a non-transient machine-readable and/or computer-readable medium for configuring a computer system to execute the method. The software modules may be stored within and/or transmitted to a computer system memory to configure the computer system to perform the functions of the module.

The computing device implementing the biometric API service 120 normally processes information according to a program (a list of internally stored instructions such as a particular application program and/or an operating system) and produces resultant output information via input/output (I/O) devices (such as NIC 930). A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

It will be appreciated that many further modifications and permutations of various aspects of the described embodiments are possible. Accordingly, the described aspects are intended to embrace all such alterations, modifications, and variations that fall within the spirit and scope of the appended claims.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

The invention claimed is:

1. A method for validation of identity of a user during a digital payment process, comprising:
receiving a user identifier that identifies a user, the user identifier having been obtained based on an in-store biometric device at an in-store environment of a merchant, the in-store biometric device being used to identify the user based on a first type of biometric identification that identifies the user in-store at the in-store environment;
identifying, based on the user identifier, a mobile device of the user, the user having been enrolled for biometric authentication at the in-store environment;
transmitting, to the mobile device, a push notification, the push notification causing an authenticator application executing on the mobile device to initiate a biometric authentication process based on a second type of biometric identification, the second type being different from the first type;
receiving a result of the biometric authentication process; and
transmitting authentication data, which is based on the result, to a transaction initiation system to trigger completion of the digital payment process.

2. The method of claim 1, wherein the digital payment process is a secure remote commerce (SRC) checkout process, and wherein the transaction initiation system is an SRC initiator.

3. The method of claim 1, wherein the user identifier is a tokenized user identifier.

4. The method of claim 3, wherein the tokenized user identifier is stored at a facial recognition system in association with biometric data of the user.

5. The method of claim 4, wherein the tokenized user identifier is determined by:
obtaining sensor data from at least one sensor;
based on the sensor data, generating a biometric template; and matching the biometric template against a database of biometric templates, each biometric template of the database being associated with a tokenized user identifier of a registered user.

6. The method of claim 1, wherein the authentication data are at least partially generated by a biometric Application Programming Interface (API) service.

7. The method of claim 6, wherein at least part of the authentication data is stored at, or obtained by, the biometric API service.

8. The method of claim 7, wherein the authentication data comprises one or more WebAuthn keys.

9. A system for validation of identity of a user during a digital payment process, comprising at least one processor in communication with computer-readable storage having stored thereon instructions to cause the at least one processor to:
receive a user identifier that identifies a user, the user identifier having been obtained based on an in-store biometric device at an in-store environment of a merchant, the in-store biometric device being used to identify the user based on a first type of biometric identification that identifies the user in-store at the in-store environment;
identify, based on the user identifier, a mobile device of the user, the user having been enrolled for biometric authentication at the in-store environment;
transmit, to the mobile device, a push notification, the push notification causing an authenticator application executing on the mobile device to initiate a biometric authentication process based on a second type of biometric identification, the second type being different from the first type;
receive a result of the biometric authentication process; and
transmit authentication data, which is based on the result, to a transaction initiation system to trigger completion of the digital payment process.

10. The system of claim 9, wherein the digital payment process is a secure remote commerce (SRC) checkout process, and wherein the transaction initiation system is an SRC initiator.

11. The system of claim 9, wherein the user identifier is a tokenized user identifier.

12. The system of claim 11, comprising a facial recognition system that stores the tokenized user identifier in association with biometric data of the user.

13. The system of claim 12, comprising at least one sensor for capturing sensor data, wherein the facial recognition system comprises a database of biometric templates, each biometric template of the database being associated with a tokenized user identifier of a registered user; and wherein the instructions cause the at least one processor to determine the tokenized user identifier by:
generating a biometric template based on the sensor data; and
matching the biometric template against the database of biometric templates.

14. The system of claim 9, wherein the authentication data are at least partially generated by a biometric Application Programming Interface (API) service.

15. The system of claim 14, wherein at least part of the authentication data is stored at, or obtained by, the biometric API service.

16. The system of claim 15, wherein the authentication data comprises one or more WebAuthn keys.

17. A non-transitory computer-readable medium having stored thereon instructions that, when executed by a processor, cause the processor to:
receive a user identifier that identifies a user, the user identifier having been obtained based on an in-store biometric device at an in-store environment of a merchant, the in-store biometric device being used to identify the user based on a first type of biometric identification that identifies the user in-store at the in-store environment;
identify, based on the user identifier, a mobile device of the user, the user having been enrolled for biometric authentication at the in-store environment;
transmit, to the mobile device, a push notification, the push notification causing an authenticator application executing on the mobile device to initiate a biometric authentication process based on a second type of biometric identification, the second type being different from the first type;
receive a result of the biometric authentication process; and
transmit authentication data, which is based on the result, to a transaction initiation system to trigger completion of a digital payment process.

18. The non-transitory computer-readable medium of claim 17, wherein the user identifier is a tokenized user identifier.

19. The non-transitory computer-readable medium of claim 18, wherein the tokenized user identifier is stored at a facial recognition system in association with biometric data of the user.

20. The non-transitory computer-readable medium of claim 19, wherein the instructions further cause the processor to:
obtain sensor data from at least one sensor;
based on the sensor data, generate a biometric template; and
match the biometric template against a database of biometric templates, each biometric template of the database being associated with a tokenized user identifier of a registered user.

* * * * *

UNITED STATES PATENT AND TRADEMARK OFFICE
CERTIFICATE OF CORRECTION

| | | |
|---|---|---|
| PATENT NO. | : 11,636,482 B2 | Page 1 of 1 |
| APPLICATION NO. | : 17/322428 | |
| DATED | : April 25, 2023 | |
| INVENTOR(S) | : Ravinathan | |

It is certified that error appears in the above-identified patent and that said Letters Patent is hereby corrected as shown below:

On the Title Page

Item (73) replace "MASTERCARD INTERNATIONAL INCORPORATED, Purchase, NY (US)" with --MASTERCARD ASIA/PACIFIC PTE. LTD., Singapore (SG)--.

Signed and Sealed this
Sixth Day of June, 2023

*Katherine Kelly Vidal*

Katherine Kelly Vidal
*Director of the United States Patent and Trademark Office*